United States Patent Office 3,565,840
Patented Feb. 23, 1971

3,565,840
COLOR STABILIZED OXIDIZED POLYETHYLENE
EMULSIONS
Frank A. Mirabile, Wayne, and Steven T. Rabel, Boonton, N.J., assignors to Allied Chemical Corporation, New York, N.Y., a corporation of New York
No Drawing. Filed May 21, 1968, Ser. No. 730,945
Int. Cl. C08f 27/22, 45/58
U.S. Cl. 260—23
9 Claims

ABSTRACT OF THE DISCLOSURE

The color of oxidized polyethylene emulsions containing an amine as an emulsifying agent may be color stabilized by the addition of a minor amount of a water soluble bisulfite salt.

BACKGROUND OF THE INVENTION

This invention relates to color stabilized aqueous dispersions of oxidized polyethylene and to a process for preparing such dispersions.

It is known that polyethylene can be made emulsifiable with water by introducing into the polymer sufficient oxygen-containing functional groups. This can be accomplished either during polymerization, such as by polymerizing ethylene in an aqueous media in combination with alcohol in the presence of an emulsifying agent and a free radical catalyst, or after polymerization, such as by exposing preformed polyethylene to an oxidizing agent. By the latter process, various oxygen-containing functional groups, such as hydroxyl, carbonyl, carboxyl, etc. are introduced, but it is generally believed that the carboxyl groups predominate and contribute most to making the polymer emulsifiable. Since the number of carboxyl groups also indicates the extent of oxidation, polyethylene which has been partially oxidized is commonly characterized by the milliequivalents of COOH per gram of polymer.

As used herein, the term "emulsifiable oxidized polyethylene" means polyethylene which has been oxidized by exposure to an oxidizing agent until it contains sufficient oxygen-containing functional groups to be emulsifiable with water using conventional emulsifying agents and conventional emulsification techniques.

The term "oxidized polyethylene emulsion," as used herein, means an aqueous dispersion of emulsifiable oxidized polyethylene.

Oxidized polyethylene emulsions are commonly prepared using as emulsifying agents a higher fatty acid in conjunction with an amine. Emulsions so prepared, to which may be added other synthetic or natural resins or waxes, are commercially useful as polishes, textile finishes, paper coatings and the like. One shortcoming, however, which detracts from their commercial usefulness is their lack of color stability. They develop a dark tan color during emulsification or shortly thereagter.

It is an object of this invention to provide an oxidized polyethylene emulsion which is color stable.

SUMMARY OF THE INVENTION

It has been discovered in accordance with this invention that the color of oxidized polyethylene emulsions which contain an amine as an emulsifying agent may be stabilized by the addition of from 0.1 to 5% of a water soluble bisulfite salt.

It is believed by us that the dark tan color which develops in unstabilized oxidized polyethylene emulsions is due to a reaction between the amine and certain of the oxygen-containing functional groups present in the oxidized polyethylene to form colored compounds, and that the bisulfite ion forms an addition type complex with these groups and so prevents them from reacting with the amine. However, we do not wish to limit the scope of our invention by this explanation.

DESCRIPTION OF THE PREFERRED EMBODIMENTS

The essential feature of this invention is the addition of about 0.1 to 5%, preferably 0.5 to 2%, by weight based on the weight of oxidized polyethylene, of a water soluble bisulfite salt to an oxidized polyethylene emulsion containing an amine as an emulsifying agent to prevent the formation therein of colored compounds. Any water soluble bisulfite salt may be used. Ammonium bisulfite and alkali metal bisulfites such as sodium bisulfite and potassium bisulfite are particularly suitable.

The bisulfite salt is operable in emulsions prepared from emulsifiable oxidized polyethylene which can be produced by various methods known in the art. Typical methods include diffusing an oxygen-containing gas through a melt of low molecular weight polyethylene, e.g., as described in U.S. Pat. 3,160,621, and exposing particle form polyethylene of essentially any molecular weight to an oxygen-containing atmosphere, such as described in U.S. Pats. 3,322,711 and 3,129,667. Of these two principal methods, the latter is preferred for preparing superior emulsions because of the better emulsifiability and wider possible range of properties inherent in the oxidized polyethylene produced thereby. Using the latter method, it is possible to produce emulsifiable oxidized polyethylene having a density in the range from 0.937 to 1.050 g./cc., a melt index from 0.1 to 7000 and a carboxyl content from 0.1 to 2.0 milliequivalents per gram.

Higher fatty acids suitable for forming the amine/fatty acid emulsifying agent are well known in the art and include the saturated and unsaturated aliphatic acids having 12 to 18 carbon atoms, such as oleic linoleic, linolenic, lauric, palymitic, stearic, etc.

Suitable amines for forming the emulsifying agent are also well known and include morpholine and water soluble aliphatic and hydroxy aliphatic amines, e.g., ethylene diamine, ethanoldiamine, dimethyl ethanolamine, triethanolamine, methoxy propylamine, 2 - amino - 2 methyl-1-propanol, etc. Triethanolamine, morpholine, and methoxypropylamine are known to be more powerful emulsifying agents and so are preferred.

The emulsion may be prepared by combining, in any order, the emulsifiable oxidized polyethylene, the bisulfite salt, the fatty acid, the amine and water in a pressure reactor equipped with an efficient stirrer; evacuating the reactor of air heating, with vigorous stirring, to a temperature ranging from the melting point of the oxidized polyethylene up to 200° C., preferably 110–160° C., and holding there for a period ranging in length from 5 minutes to 5 hours.

Other methods known to the art may also be used for preparing the emulsion, e.g., melting the oxidized polyethylene together with the emulsifying agents and the bisulfite salt and adding this composition gradually to vigorously stirred water heated to about 90–100° C.

One hundred parts by weight of oxidized polyethylene may be emulsified with 1 to 50, preferably 4 to 30, parts by weight each of the fatty acid and the amine.

Sufficient water should be added to bring the concentration of oxidized polyethylene to the desired level. The emulsion may contain up to 50% of the oxidized polyethylene.

Maximum color stabilization is achieved with the bisulfite salt concentration at about 2% by weight based on the oxidized polyethylene. Larger amounts may be added but are wasteful.

Example 1—Control

An oxidized polyethylene emulsion was prepared by combining 200 grams of emulsifiable oxidized polyethylene having a density of 0.99 g./cc., a melt index between 2000 and 3000 and a carboxyl content of about 0.5 meq./g., 36 grams methoxypropylamine, 36 grams oleic acid, and 500 grams water in a pressure reactor, heating the mixture to 150° C. and holding there for 30 minutes with vigorous stirring.

The emulsion had a dark tan color. The degree of light transmission through the emulsion was 78%.

Examples 2–4

A series of three emulsions were prepared according to the procedure of Example 1 except 0.52, 1.10 and 3.30 grams of ammonium bisulfite were added, respectively, to each member of the series. The color of each emulsion improved, i.e., was lighter, with successively higher concentrations of ammonium bisulfite. The percent light transmission through each was, respectively, 82, 91 and 95.

None of the four emulsions contained unemulsified solids.

We claim:
1. A color stabilized emulsion comprising:
   (a) emulsifiable oxidized polyethylene,
   (b) a higher fatty acid,
   (c) an amine selected from the group consisting of morpholine and water soluble aliphatic or hydroxy aliphatic amines,
   (d) a water soluble bisulfite salt, and
   (e) water.
2. The composition of claim 1 wherein the oxidized polyethylene has a density between 0.937 and 1.050 g./cc., a melt index between 0.1 and 7000, and a carboxyl content between 0.1 and 2.0 milliequivalents per gram.
3. The composition of claim 1 wherein the higher fatty acid has 12 to 18 carbon atoms and has a concentration of from 4 to 30% based on the weight of the oxidized polyethylene.
4. The composition of claim 1 wherein the amine has a concentration of from 4 to 30% based on the weight of the oxidized polyethylene.
5. The composition of claim 1 wherein the bisulfite salt is selected from the group consisting of alkali metal bisulfites and ammonium bisulfite and has a concentration of at least 0.5% based on the weight of the oxidized polyethylene.
6. The composition of claim 1 wherein the bisulfite salt is selected from the group consisting of alkali metal bisulfites and ammonium bisulfite and has a concentration of from about 0.1–5% based on the weight of the oxidized polyethylene.
7. The composition of claim 6 wherein the oxidized polyethylene has a density between 0.937 and 1.050 g./cc., a melt index between 0.1 and 7000, and a carboxyl content between 0.1 and 2.0 milliequivalents per gram.
8. The composition of claim 7 wherein the higher fatty acid has 12 to 18 carbon atoms and has a concentration of from 4 to 30% based on the weight of the oxidized polyethylene.
9. The composition of claim 8 wherein the amine has a concentration of from 4 to 30% based on the weight of the oxidized polyethylene.

References Cited

UNITED STATES PATENTS 2,874,137  2/1959  Pisanchyn et al. _____ 260—29.6

DONALD E. CZAJA, Primary Examiner

D. J. BARRACK, Assistant Examiner

U.S. Cl. X.R.

106—8; 117—138.5, 152; 260—28.5, 29.6, 45.7, 94.9